United States Patent
Kammachi Sreedhar et al.

(10) Patent No.: US 12,019,761 B2
(45) Date of Patent: Jun. 25, 2024

(54) NETWORK BASED MEDIA PROCESSING SECURITY

(71) Applicant: Nokia Technologies Oy, Espoo (FI)

(72) Inventors: Kashyap Kammachi Sreedhar, Tampere (FI); Yu You, Kangasala (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 356 days.

(21) Appl. No.: 17/440,395

(22) PCT Filed: Mar. 20, 2019

(86) PCT No.: PCT/FI2019/050234
§ 371 (c)(1),
(2) Date: Sep. 17, 2021

(87) PCT Pub. No.: WO2020/188139
PCT Pub. Date: Sep. 24, 2020

(65) Prior Publication Data
US 2022/0164453 A1     May 26, 2022

(51) Int. Cl.
*H04L 29/06*        (2006.01)
*G06F 9/48*         (2006.01)
(Continued)

(52) U.S. Cl.
CPC .......... *G06F 21/602* (2013.01); *G06F 9/4818* (2013.01); *G06F 21/10* (2013.01)

(58) Field of Classification Search
CPC ............. H04L 63/0428; H04L 63/0435; H04L 63/0457; H04L 9/088; H04L 63/205;
(Continued)

(56) References Cited

U.S. PATENT DOCUMENTS

2013/0006866 A1 * 1/2013 Pendakur ......... H04N 21/23614
                                                          705/50
2013/0227662 A1    8/2013 Crampton
(Continued)

FOREIGN PATENT DOCUMENTS

CA      3073519 A1 * 3/2019 ............. G06F 9/448
JP      2016-189138 A    11/2016
(Continued)

OTHER PUBLICATIONS

Extended European Search Report received for corresponding European Patent Application No. 19920435.5, dated Oct. 13, 2022, 8 pages.
(Continued)

*Primary Examiner* — Tri M Tran
(74) *Attorney, Agent, or Firm* — ALSTON & BIRD LLP (57) ABSTRACT

According to an example aspect of the present invention, there is provided a method, comprising receiving from a source entity a workflow description for network based media processing (200), determining encryption requirements on the basis of an encryption descriptor in the workflow description, the encryption descriptor comprising information indicative of one or more encryption methods and at least one prioritized encryption method (210), and selecting, on the basis of the encryption descriptor, an encryption method for protecting data for at least one task of a media processing workflow generated on the basis of the workflow description (220).

20 Claims, 4 Drawing Sheets (51) Int. Cl.
  *G06F 21/10* (2013.01)
  *G06F 21/60* (2013.01)
(58) Field of Classification Search
  CPC ........... H04L 63/0853; H04L 2463/062; G06F 21/10; G06F 9/4818; G06F 21/602; H04N 21/2347; H04N 21/235
  See application file for complete search history.

(56) References Cited

U.S. PATENT DOCUMENTS

2014/0310518 A1   10/2014   Giladi
2019/0037252 A1   1/2019    Wagenaar et al.

FOREIGN PATENT DOCUMENTS

KR   10-0749998 B1    8/2007
KR   2014-0089733 A   7/2014

OTHER PUBLICATIONS

"IPsec", Wikipedia, Retrieved on Oct. 26, 2022, Webpage available at : https://en.wikipedia.org/w/index.php?title=IPsec&oldid=888019995.

Office action received for corresponding Chinese Patent Application No. 201980094470.X, dated Feb. 12, 2023, 8 pages of office action and no page of translation available.

Office action received for corresponding Chinese Patent Application No. 201980094470.X, dated Jul. 23, 2023, 8 pages of office action and no page of translation available.

"Networking Practical Training Tutorial", Xi'an Jiaotong University Press, 2008, pp. 170-175.

Office action received for corresponding Korean Patent Application No. 2021-7033930, dated Aug. 17, 2023, 8 pages of office action and 4 pages of Summary available.

International Search Report and Written Opinion received for corresponding Patent Cooperation Treaty Application No. PCT/FI2019/050234, dated Jul. 12, 2019, 15 pages.

"Information technology—Coded representation of immersive media-Part 8: Network Based Media Processing", ISO/IEC JTC1/SC 29/WG 11, ISO 23090-8:2018 E, 2018, 100 pages.

Park et al., "Use cases and requirements for NBMP (v4)", SO/IEC JTC1/SC29/WG11 MPEG2018/N17502, Apr. 2018, 31 pages.

Rejection Decision received for corresponding Chinese Patent Application No. 201980094470.X, dated Oct. 27, 2023, 6 pages of Rejection Decision and No. page of translation available.

Notice of Allowance received for corresponding European Patent Application No. 19920435.5, dated Nov. 24, 2023, 8 pages.

* cited by examiner

NETWORK BASED MEDIA PROCESSING SECURITY

RELATED APPLICATION

This application was originally filed as PCT Application No. PCT/FI2019/050234, filed on Mar. 20, 2019, of which is incorporated herein by reference in its entirety.

FIELD

Various example embodiments relate to network based media processing security, and in particular controlling encryption in a network based media processing system.

BACKGROUND

Network-based media processing, NBMP, allows service providers and end users to distribute media processing operations. NBMP provides a framework for distributed media and metadata processing, which may be performed in IT and telecom cloud networks.

NBMP abstracts the underlying compute platform interactions to establish, load, instantiate and monitor the media processing entities that will run the media processing tasks. The NBMP system may include: uploading of media data to the network for processing; instantiating media processing entities (MPE)s; configuring the MPEs for dynamic creation of media processing pipeline; and accessing the processed media data and the resulting metadata in a scalable fashion in real-time or in a deferred way. The MPEs may be controlled and operated by a workflow manager in a NBMP platform that comprises computation resources for implementing the workflow manager and the MPEs. A secured channel may be applied for providing and distributing content.

SUMMARY

Some aspects of the invention are defined by the features of the independent claims. Some specific embodiments are defined in the dependent claims.

According to a first example aspect, there is provided a method, comprising receiving from a source entity a workflow description for network based media processing, determining encryption requirements on the basis of an encryption descriptor in the workflow description, the encryption descriptor comprising information indicative of one or more encryption methods and at least one prioritized encryption method, and selecting, on the basis of the encryption descriptor, an encryption method for protecting data for at least one task of a media processing workflow generated on the basis of the workflow description.

According to a second example aspect, there is provided a method comprising means for performing: generating a workflow description for network-based media processing, including in the workflow description an encryption descriptor comprising information indicative of encryption methods and at least one prioritized encryption method; and sending the workflow description comprising the encryption descriptor to a workflow manager.

There is also provided an apparatus comprising at least one processor, at least one memory including computer program code, the at least one memory and the computer program code being configured to, with the at least one processor, cause the apparatus at least to carry out features in accordance with the first and/or second aspect, or any embodiment thereof.

According to still further example aspects, there are provided a computer program and a computer-readable medium, or a non-transitory computer-readable medium, configured, when executed in a data processing apparatus, to carry out features in accordance with the first and/or second aspect, or an embodiment thereof.

BRIEF DESCRIPTION OF THE DRAWINGS

Some example embodiments will now be described with reference to the accompanying drawings.

EMBODIMENTS

Figure 1:
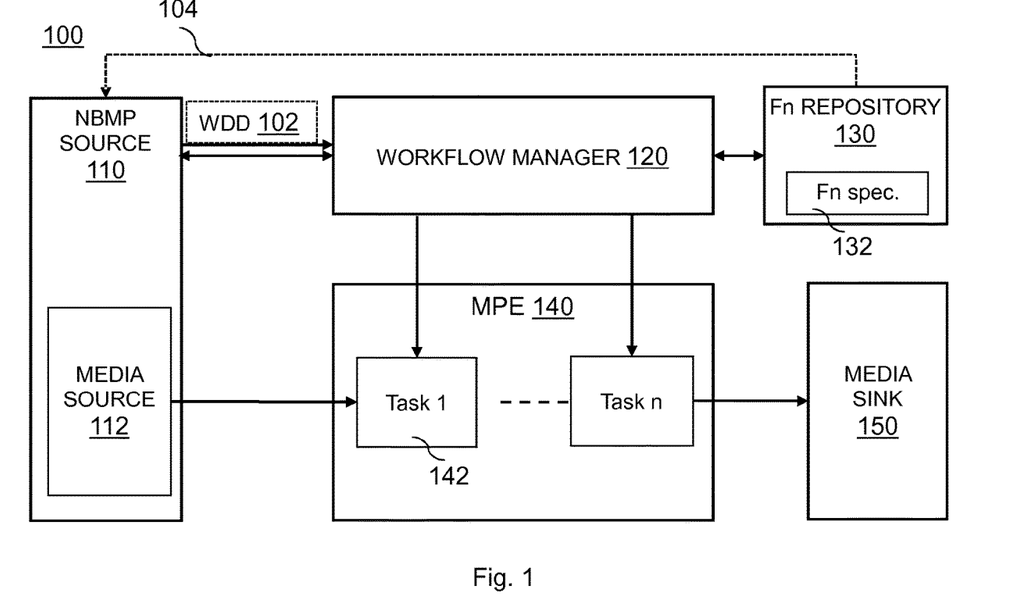
FIG. 1 illustrates an example of NBMP system.

FIG. 1 illustrates a Network-based Media Processing (NBMP) system 100, which is a system for processing that is performed across processing entities in the network.

The system 100 comprises an NBMP source 110, which is an entity that provides media content to be processed. The NBMP source triggers and describes media processing for the NBMP system by a workflow description. The NBMP source describes the requested media processing and provides information about the nature and format of the associated media data in the workflow description. The NBMP source may comprise or be connected to one or more media sources 112, such as a video camera, an encoder, or a persistent storage. The NBMP source 110 may be controlled by a third-party entity, such as a user equipment or another type of entity or device providing feedback, metadata, or network metrics to the NBMP source 110, for example.

A workflow manager 120 is an entity that orchestrates the network-based media processing and may also be referred to as a (NBMP) control function. The workflow manager receives the workflow description from the NBMP source via a workflow API and builds a workflow for requested media processing. The workflow description, which may also be herewith referred to as the workflow description document (WDD), describes the information that enables the NBMP workflow. The workflow manager 120 provisions tasks and connects them to create a complete workflow based on the workflow description document and function descriptions. The NBMP workflow provides a chain of one or more task(s) to achieve a specific media processing. Chaining of task(s) can be sequential, parallel, or both at any level of the workflow. The workflow may be represented as a directed acyclic graph (DAG).

The workflow manager 120 can be implemented with a dedicated server that may be virtualized, but also as a function in cloud computing. Hence, instead of a processor and memory, the workflow manager 120 may comprise a processing function and a memory function for processing and storing data. On top of these functions, the workflow manager 120 may also comprise some further functions such as a persistent storing function and a communication interface function alike various other entities herein, but such functions are not illustrated in sake of brevity and simplicity.

The system 100 further comprises a function repository 130. In an example embodiment, the function repository 130 is a network based function. In an example embodiment, the function repository 130 stores a plurality of function specifications 132 for use by the workflow manager 120 in defining tasks to a media processing entity 140. A function discovery API to the function repository 130 enables the workflow manager and/or the NBMP source (by 104) to discover media processing functions that can be loaded as part of a media processing workflow.

A Media Processing Entity (MPE) is an entity performing one or more media processing tasks provisioned by the workflow manager 120. The MPE executes the tasks applied on media data and related metadata received from the NBMP source 110 via an NBMP task API or another MPE. The task(s) in the MPE produce media data and related metadata to be consumed by a media sink entity 150 or other task(s) in another MPE. The media sink entity 150 is generally a consumer of the output of a task of an MPE. The content processed by the task 142 may be sent in a NBMP publish format to the media sink entity through existing delivery methods with suitable media formats, for example through download, DASH, MMT, or other means.

A network based media processing (or NBMP) function may be a standalone and self-contained media processing operation and the corresponding description of that operation. The NBMP function performs processing of the input media that can generate output media or metadata. Non-limiting examples of such media processing include; content encoding, decoding, content encryption, content conversion to HDR, content trans-multiplexing of the container format, streaming manifest generation, frame-rate or aspect ratio conversion, and content stitching, etc. A media processing task (also referred to as "task" for brevity below) is a running instance of a network based media processing function that gets executed within the MPE 140.

In an example embodiment, the MPE 140 is a process or execution context (e.g. appropriate hardware acceleration) in a computer. Multiple MPEs can be defined with in one computer. In this case, communications between tasks across MPEs can happen through process-friendly protocols such as Inter-Process Communication (IPC).

In an example embodiment, the MPE 140 is a dedicated apparatus, such as a server computer. In another example embodiment, the MPE 140 is a function established for this purpose by the workflow manager 120 using, for example, a suitable virtualization platform or cloud computing. In these cases, communications between tasks across MPEs typically use IP-based protocols.

The workflow manager 120 has a communicative connection with the NBMP source 110 and with the function repository 130. In an example embodiment, the function repository 130 further has a communicative connection with the NBMP source 110. The workflow manager 120 communicates with the underlying infrastructure (e.g. a cloud orchestrator) to provision the execution environments such as containers, virtual machines (VMs), or physical computer hosts, which may thus operate as MPEs.

The NBMP system 100 may further comprise one or more stream bridges, optionally interfacing the media processing entity 140 with the media source 112 and a media sink 150, respectively.

To secure data transmission in the system 100, TLS or secure tunneling (e.g. IPSec or secure shell (SSH)) may be applied. There are now provided improvements for guiding or controlling encryption configuration for network based media processing, enabling a media source entity to further affect the applied encryption method and thereby the level of security for the media processing.

Figure 2:
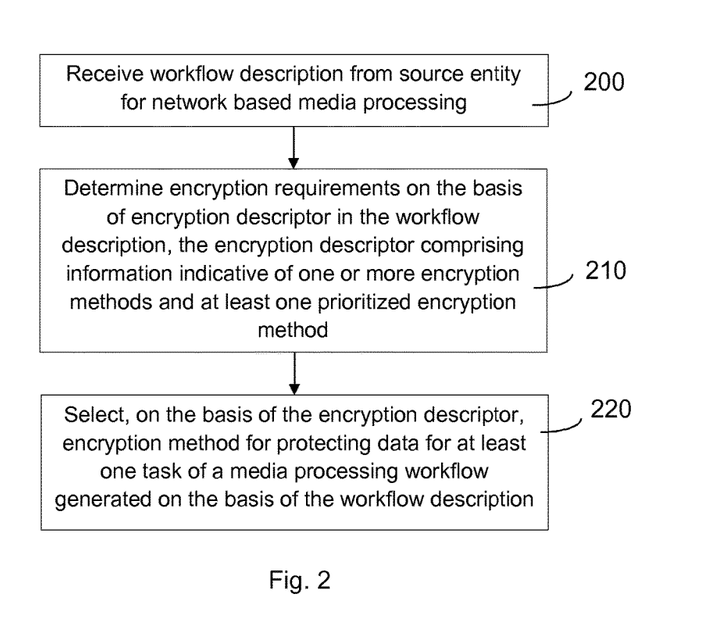
FIGS. 2 to 4 are flow graphs of methods in accordance with at least some embodiments.

FIG. 2 illustrates a method for controlling encryption for network based media processing. The method may be implemented by an apparatus generating or controlling media processing workflows, such as the workflow manager 120.

A workflow description for network based media processing is received 200. For example, a WDD may be received from the NBMP source entity 110.

Encryption requirements are defined 210 on the basis of encryption descriptor in the workflow description. The encryption descriptor comprises information indicative of one or more encryption methods and at least one prioritized encryption method. On the basis of the encryption descriptor, an encryption method is selected 230 for protecting data for at least one task of a media processing workflow generated on the basis of the workflow description.

The workflow manager 120 may after block 220 cause application of the selected encryption method(s) for the workflow defined on the basis of workflow description and associated deploy media processing tasks to selected one or more MPEs 140.

Figure 3:
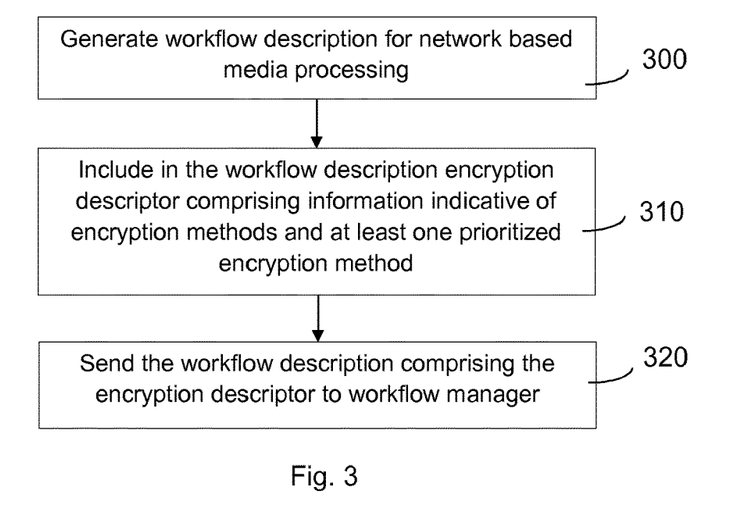

FIG. 3 illustrates a method for controlling encryption for network based media processing. The method may be implemented in an apparatus initiating network based media processing, such as the NBMP source entity 110 providing the workflow description to the workflow manager 120 performing the method of FIG. 2.

A workflow description is generated 300 for network based media processing. An encryption descriptor is included 310 in the workflow description. The encryption descriptor may provide encryption parameters for media data encryption in the network based media processing system. The encryption descriptor may comprise encryption requirements for the workflow. The encryption descriptor comprises information indicative of encryption methods and at least one prioritized encryption method.

The workflow description comprising the encryption descriptor is sent 320 from a NBMP source to a workflow manager.

Before block 300, the NBMP source 120 may connect the function repository 130 and receive function specification data from the function repository. The workflow description may be defined, or generated in block 300, based on the received function specification data. Encryption (and also other security related requirements or functions) can be available from the function repository (provided as encryption functions, for example).

The encryption descriptor may define encryption methods supported and/or allowable, by the media source entity 110. For example, the encryption descriptor may identify three encryption methods, of which one is indicated as the prioritized method. In another example, the encryption descriptor (and the method prioritization) is applied to indicate a requirement, e.g. by including only single encryption method (also as the prioritized method) that needs to be used. The encryption method may be indicated e.g. by identifying an encryption algorithm or protocol. The encryption descriptor may comprise further information on the encryption method(s), such as key length. For example, the encryption descriptor may indicate that AES-128 is not acceptable but AES-256 is. It is to be noted that some encryption methods may comprise integrity protection and/or message authentication code (MAC) features, such as hash-based MAC (HMAC).

Figure 4:
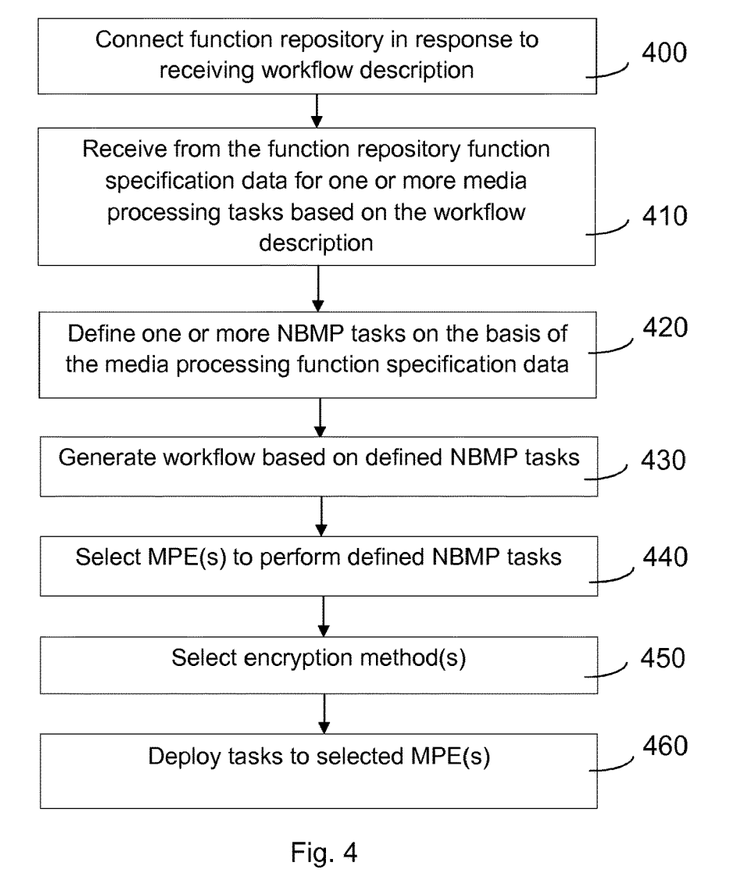

FIG. 4 illustrates further features for the apparatus configured to perform the method of FIG. 2, such as the workflow manager 120.

When a request for media processing, and the workflow description, is received from the NBMP source 110, the workflow manager 120 connects 400 the function repository 130. The NBMP may thus scan function repository to find the list of all functions that could fulfill the request. In block 410 function specification data is received for one or more media processing tasks based on the workflow description.

NBMP tasks are defined 420 on the basis of the received media processing function specification data (and the workflow description). Using the workflow description from the NBMP source, the workflow manager 120 may thus check to detect which functions from the function repository 130 need to be selected for meeting the workflow description. This checking may depend on the information for media processing from the NBMP source, such as input and output description, description of the requested media processing; and different descriptors for each function in the function directory. The request(s) are mapped to appropriate media processing tasks to be included in the workflow. Once the functions required to be included in the workflow are identified using the function repository, the next step is to run them as tasks and configure those tasks so they can be added to the workflow.

Once the required tasks are defined (e.g. as a task list), the workflow DAG may be generated 430 on the basis of the defined tasks. MPE(s) to perform the defined tasks may then be selected 440.

One or more encryption methods are selected 450, on the basis of the encryption descriptor. It is to be noted that in alternative embodiments the encryption method selection may be performed already earlier, e.g. in connection with block 420 or 430. In a further embodiment, the encryption method selection is performed at multiple instants, e.g. for communication with the source entity at block 420 (or even earlier), and for the MPEs after block 440.

The defined tasks of the workflow may be deployed and the selected encryption method(s) may be indicated to respective selected MPE(s) in block 460. Instead of adding (de-)encryption to every task, an encryption descriptor may be applied to define scope and details for encryption operations. The selected MPE(s) receive their respective encryption method information and may initiate encryption and/or decryption operations for the media processing task(s).

In some embodiments, the workflow manager defines one or more tasks for media content encryption and/or decryption on the basis of the selected encryption method, and includes the task(s) in a workflow generated on the basis of the workflow description. Hence, encryption and/or decryption tasks may be added to the workflow on the basis of the encryption method selection, and the tasks are deployed 460 to the selected MPE(s).

The first MPE in the workflow may be thus configured to apply the selected encryption method for communicating with the source entity. The selected encryption method may be applied for communicating with another MPE selected for the workflow or the media sink entity of the workflow. In some embodiments, a plurality of encryption methods may be selected 220, 450 on the basis of the encryption descriptor. For example, a first encryption method is selected for communication with the source entity 110 and a second encryption method is selected for communication with the sink entity 150 or another MPE 140.

In an embodiment, the defined tasks of the workflow may be deployed 460, and the selected encryption method(s) may be used for communicating with the source entity. The workflow manager may be configured to deploy a communication decryption method, which decrypts encrypted data from the source entity 110 before the data is provided to a task of an MPE, i.e. before consumed by the tasks in the MPE, thus providing a transparent communication path between the task in the MPE and the media source.

In some embodiments, at least some information in the encryption descriptor is sent by the workflow manager 120 to one or more network entities, such as the selected MPE(s) 140 and the sink entity 150. The information may be included in a descriptor for communicating over the respective API, such as a task API to an MPE (e.g. in a descriptor illustrated below for WDD but applied also over the respective API). The network entities may then initiate encryption operations on the basis received encryption descriptor information. For example, encryption token related information in the encryption descriptor may be applied for generating or accessing an encryption token for the network entity. In some embodiments, as already indicated, tasks are generated to the workflow on the basis of the encryption descriptor.

The workflow manager 120 may thus calculate the resources needed for the tasks and then apply for selected MPE(s) from infrastructure provider(s) in block 460. The number of assigned MPEs and their capabilities may be based upon the total estimated resource requirement of the workflow and the tasks, with some over-provisioning capabilities in practice. In some embodiments, the encryption descriptor is applied in selecting the MPE(s). The actual placement of tasks may be carried out by a cloud orchestrator, which may reside in a cloud system platform.

Using the workflow information, the workflow manager 120 may extract the configuration data and configure the selected tasks once the workflow is final. The configuration of these tasks may be performed using the Task API supported by those tasks.

The NBMP source entity 110 may further be informed that the workflow is ready and that media processing can start. The selected encryption method may be indicated also to the NBMP source entity 110. The NBMP source(s) 110 can then start transmitting their media to the network for processing.

In some embodiments, the NBMP workflow manager 120 may generate an MPE application table that comprises minimal and maximal MPE requirements per task and sends the table (or part thereof) to the cloud infrastructure/orchestrator for MPE allocation.

The workflow setup by the workflow manager 120 can be represented using a DAG. Each node of the DAG represents a processing task in the workflow. The links connecting one node to the other node in the graph represents the transfer of output of the former as input to the later. The details for input and output ports for a task is provided in general descriptor of a task.

A task connection map parameter may be applied to describe DAG edges statically and is a read/write property. Further, there may a list of task identifiers, which may be referred to as a task set. The task set may define task instances and their relationship with NBMP functions, and comprise references to task descriptor resources, managed via the Workflow API.

Figure 5:
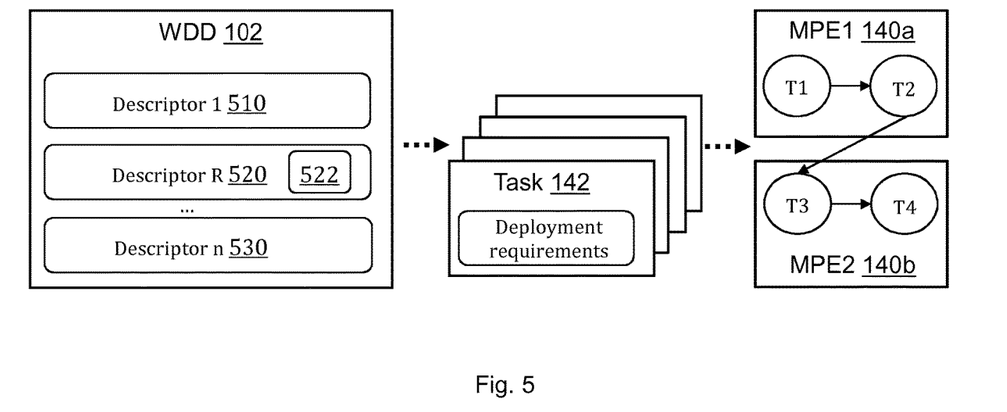
FIG. 5 illustrates workflow description and resulting task deployment.

FIG. 5 illustrates a WDD 102. The WDD may be a container file or a manifest with key data structures comprising multiple descriptors 510, 520, 530 from functional ones (e.g. input/output/processing) to non-functional ones (e.g. requirements). The WDD 102 describes details such as input and output data, required functions, requirements etc.

for the workflow by the set of descriptors 510, 520, 530. For example, the WDD may comprise at least some of a general descriptor, an input descriptor, an output descriptor, a processing descriptor, a requirements descriptor 520, a client assistance descriptor, a failover descriptor, a monitoring descriptor, an assertion descriptor, a reporting descriptor, authentication and authorization descriptor, and a notification descriptor.

The encryption descriptor may be an independent descriptor (e.g. at the same level as the input/output and general descriptor), or combined with or included in another descriptor. In some embodiments, the encryption descriptor is included as part 522 of the requirements descriptor 520 of the WDD 102. The encryption descriptor may be included as part of security requirements of the WDD 102 and the requirements descriptor 520. The workflow description and the encryption descriptor may be encoded in JavaScript Object Notation (JSON) or Extensible Markup Language (XML), for example.

FIG. 5 also illustrates that individual NBMP tasks 142 are generated on the basis of the WDD 102. NBMP tasks 142 are instances of the NBMP function templates (from the function repository 130), which may reuse and share same syntax and semantics from some of the descriptors applied also in the WDD.

On the basis of the requirements descriptor 520, such as deployment requirements of each task, one or more MPE(s) may be selected and a workflow DAG involving one or more MPEs 140 may be generated. In the simple example of FIG. 5, tasks T1 and T2 are deployed by a first MPE1 140a, and subsequent tasks T3 and T4 by a second MPE2 140b. References to encryption resources (encryption methods) may be applied in the workflow representation, within a data-flow edge of workflow tasks or a (task/execution) dependency tree.

Figure 6:
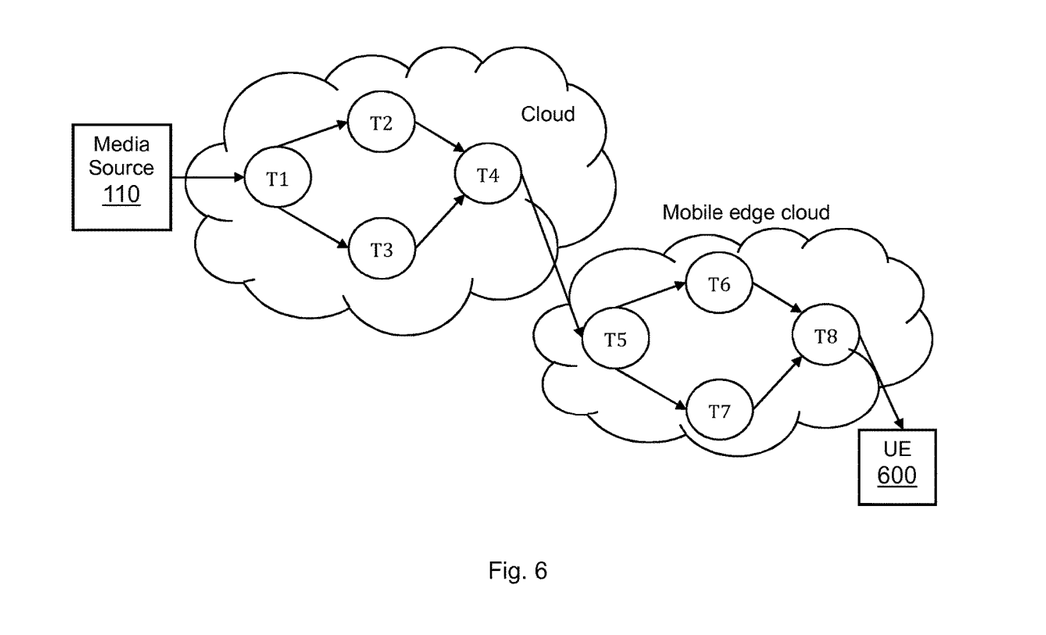
FIG. 6 illustrates an example of a media processing workflow and task placement.

FIG. 6 provides another example, illustrating a media processing workflow comprising tasks T1-T8 from NBMP source 110 to a user equipment (which may the media sink) 600. Some of the tasks have been allocated to a (central) cloud system, whereas other tasks are carried out by a mobile edge computing cloud system. Different cloud regions and networks may have different requirements for encryption.

The encryption descriptor may comprise a list of encryption methods. The encryption descriptor may comprise a priority list mapped to a list of the encryption methods. However, it will be appreciated that there are many other ways of indicating one or more prioritized encryption methods among the set of the encryption methods included in the encryption descriptor, e.g. having the encryption methods listed in order of preference or having a specific indicator for the prioritized encryption method(s). In one embodiment, priority values are applied to indicate priority of at least some of the identified encryption methods in the encryption descriptor.

The encryption descriptor may associate the NBMP source entity 110 with at least one encryption method supported by the NBMP source entity 110, e.g. by identifying the NBMP identifier together with an encryption method identifier.

In an embodiment, the encryption descriptor is included as an attribute under a security descriptor. The security descriptor may comprise parameters including but not limited to encryption, authentication of NBMP session. It is to be appreciated that above embodiments illustrate only some examples of available options for incorporating the encryption descriptor in NBMP signaling and the WDD 102, and various other placement and naming options can be used.

In some embodiments, the encryption descriptor indicates direction in which at least one of the encryption methods is to be used. For example, the encryption descriptor comprises of a direction list (or a list of directed chains) indicating the direction in which the encryption method is to be used. A direction element in the direction list may indicate if the associated encryption method is to be used between the source entity and the MPE, between two MPEs, or between the MPE and the sink entity. The workflow manager which parses the encryption descriptor may determine the direction of the encryption method based on the direction element and selects the encryption method to be used.

In an embodiment, the encryption descriptor comprises one or more source to method attributes. This attribute may comprise a media source element and an encryption method element. The media source element may indicate the media source 112 within the NBMP source 110. The encryption method element indicates the encryption method(s) supported by the media source 112 indicated in the media source element. For example, a first media source indicated in the media source element supports a first and a second encryption method indicated in the corresponding encryption method element. A second media source indicated in the media source element supports a third encryption method indicated in the corresponding encryption method element. Thus, encryption methods supported (and prioritized) by individual media sources 112 of the NBMP source 110 may be indicated in the workflow description and the encryption method selected 220, 450 accordingly.

In some embodiments, the encryption descriptor comprises an encryption token. For example, Advanced Encryption Standard-Cipher Block Chaining (AES-CBC) token may be included or referred to in the encryption descriptor.

In some embodiments, the encryption descriptor comprises information for generating and/or accessing an encryption token. The encryption descriptor may indicate an algorithm for generating an encryption token. The encryption descriptor may indicate a uniform resource locator (URL) of an encryption token in the media source or on an encryption server. The encryption descriptor may comprise a template for generating a uniform resource locator of an encryption token. The template may be used because of segment naming conventions. On the basis template, the URL may be generated by a network entity (e.g. the MPE) performing encryption related operations on the basis of the information in the descriptor. The template may be defined on the basis of a media presentation description, such as start time and/or duration.

The encryption descriptor may indicate association of a media stream and an encryption token. The encryption descriptor may indicate lifetime, replacement period, or rotation period of an encryption token. This information may define a period after which the token needs to be replaced or rotate.

In a further example embodiment, the encryption descriptor comprises an element for providing a token for encrypting and/or decrypting the encryption token. Such element may be referred to as keyEncryptingKey element, for example.

Different tokens (and/or encryption methods) may be applied for different media content inputs or streams. For example, if an NBMP function uses content from different media sources, wherein a subset of the sources are more sensitive from the perspective of personal data (e.g., cameras streams from home indoor monitoring system), whereas others are outdoor camera media streams, which are less privacy-sensitive. The two different types of streams are delivered with encryption but may have different token length as well as refresh interval.

It is to be appreciated that above-illustrated information/elements for the encryption descriptor, e.g. related to encryption token, may be applied in various ways and combinations, depending on the capabilities and supported encryption method(s). For example, the encryption descriptor may comprise an encryption token URL for a first encryption method and a template for a second encryption method.

In some embodiments, the encryption descriptor is included in or referred to in an input descriptor and/or output descriptor, which may be included in the workflow description. Presence of encryption parameters in the input descriptor indicates that the input media content from the media source to the MPE is encrypted using the encryption method(s) as indicated by the encryption parameters. The encryption of media data is independent of the encryption of the communication channels between the media source and the network entity. Presence of encryption parameters in the output descriptor indicates that the content output from an MPE to a sink entity is to be encrypted based on the encryption parameters. Additionally, an output manifest may be generated, indicating the encryption related parameters used for encrypting the output media.

The encryption parameters in the input and/or output descriptor may be part of the media and metadata parameter attributes or under the other parameter attribute, for example. In an alternate embodiment the encryption parameters may be included in an external document linked by an URL in the input and/or output descriptor.

Encryption implementation can be done at different SW stacks in the system 100. In some implementation options, at least some encryption can be provided by an encrypted overlay network, e.g. based on TLS. It is to be noted that content may be encrypted by an encryption method selected based on the encryption descriptor within an encrypted tunnel (e.g., based on TLS or secure tunneling). In some cases, a secure tunnel may comprise unencrypted content.

In some embodiments, encryption operations are implemented as NBMP encryption tasks. Advantages of NBMP task based implementation include that encryption can be enabled at the task level, encryption can be upgraded independently, and new encryption methods can be added to live NBMP systems (good extensibility).

In some embodiments, the security descriptor enables different level of security for media data and metadata. The encryption descriptor may be an array of security data structure and comprise identifiers of resources that can be manipulated (e.g. add/change/delete) via an API on the basis of the identifier. For example, media data and metadata may have specific IDs and different encryption (and other security) requirements may be defined based on their IDs in the descriptor.

The encryption descriptor may be applied by the workflow manager 120 for generating a NBMP workflow, or in some embodiments for updating or modifying an existing workflow. Thus, one or more encryption and/or decryption tasks are added to the workflow comprising the media processing tasks.

Figure 7:
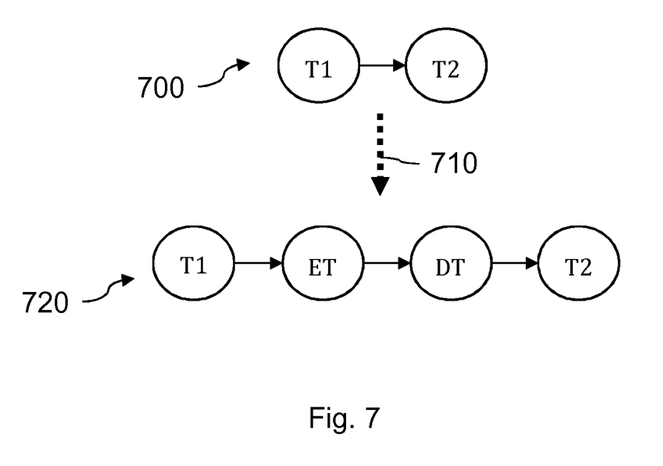
FIG. 7 illustrates task based encryption.

FIG. 7 illustrates a simple example of task based encryption. An initial workflow 700 represented by a DAG comprises tasks T1 and T2. An encryption task ET and decryption task DT are added 710 to the final workflow 720 by the NBMP workflow manager, to enable secure line between the tasks T1 and T2.

In an embodiment, such tasks (based on the encryption descriptor) are added at the deployment stage 460. For example, the workflow manager may modify the workflow task connection map by insetting new build-in encryption and decryption tasks between the initial tasks. This way the NBMP system can re-use existing communication channels regardless to the underlying transport layers (unprotected or secured e.g. by TLS). Some NBMP vender-specific encryption methods can be further activated to have enhanced protection if needed.

An electronic device comprising electronic circuitries may be an apparatus for realizing at least some embodiments of the present invention. The apparatus may be or may be comprised in a computer, a network server, a cellular phone, a machine to machine (M2M) device (e.g. an IoT sensor device), or any other network or computing apparatus provided with communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 8:
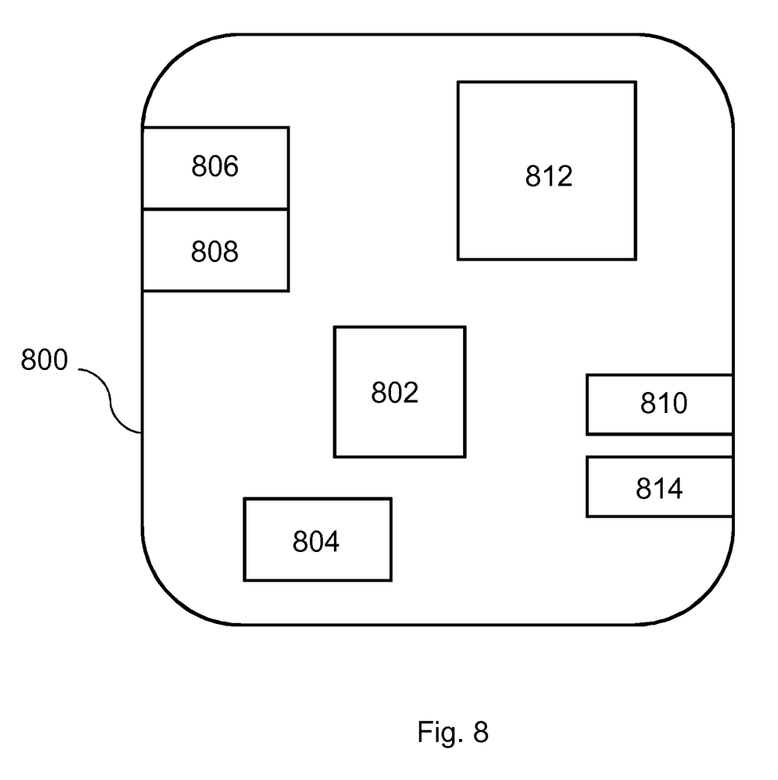
FIG. 8 illustrates an example apparatus capable of supporting at least some embodiments.

FIG. 8 illustrates an example apparatus capable of supporting at least some embodiments of the present invention. Illustrated is a device 800, which may comprise a communication device configured to control network based media processing. The device may include one or more controllers configured to carry out operations in accordance with at least some of the embodiments illustrated above, such as some or more of the features illustrated above in connection with FIGS. 2 to 7. For example, the device 800 device may be configured to operate as the workflow manager or the NBMP source performing the method of Figure.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device. For example, control parameters affecting operations related to network based media processing encryption control may be stored in one or more portions of the memory and used to control operation of the apparatus. Further, the memory may comprise device-specific cryptographic information, such as secret and public key of the device 800.

The device 800 may comprise a transmitter 806. The device may comprise a receiver 808. The transmitter and the receiver may be configured to transmit and receive, respectively, information in accordance with at least one cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 3GPP new radio access technology (N-RAT), IS-95, wireless local area network, WLAN, and/or Ethernet standards, for example. The device 800 may comprise a near-field communication, NFC, transceiver 810. The NFC transceiver may support at least one NFC technology, such as NFC, Bluetooth, Wibree or similar technologies.

The device 800 may comprise user interface, UI, 812. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, cause and control media processing operations, and/to manage digital files stored in the memory 804 or on a cloud accessible via the transmitter 806 and the receiver 808, or via the NFC transceiver 810.

The device 800 may comprise or be arranged to accept a user identity module 814. The user identity module may comprise, for example, a subscriber identity module, SIM, card installable in the device 800. The user identity module 814 may comprise information identifying a subscription of a user of device 800. The user identity module 814 may comprise cryptographic information usable to verify the identity of a user of device 800 and/or to facilitate encryption of communicated media and/or metadata information for communication effected via the device 800.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver.

The device 800 may comprise further devices not illustrated in FIG. 8. For example, the device may comprise at least one digital camera. Some devices 800 may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 810 and/or the user identity module 814.

The processor 802, the memory 804, the transmitter 806, the receiver 808, the NFC transceiver 810, the UI 812 and/or the user identity module 814 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor, and at least one memory including computer program code, the at least one memory and the computer program code being configured to, with the at least one processor, cause the apparatus to:
   receive from a source entity a workflow description for network based media processing,
   determine encryption requirements on the basis of an encryption descriptor in the workflow description, the encryption descriptor comprising information indicative of one or more encryption methods and at least one prioritized encryption method, and
   select, on the basis of the encryption descriptor, an encryption method for protecting data for at least one task of a media processing workflow generated on the basis of the workflow description.

2. The apparatus of claim 1, wherein the memory and computer program code are further configured to, with the processor, cause the apparatus to:
   define, by a workflow manager, at least one task for media content encryption and/or decryption on the basis of the selected encryption method, and
   include the at least one task for media content encryption and/or decryption in a workflow generated on the basis of the workflow description.

3. The apparatus of claim 1, wherein a workflow manager is caused to apply the selected encryption method for decrypting encrypted data from the source entity before providing the data to a media processing task by a media processing entity.

4. The apparatus of claim 1, wherein a media processing entity selected for the workflow is caused to apply the selected encryption method for communicating with another media processing entity selected for the workflow or a media sink entity of the workflow.

5. The apparatus of claim 1, wherein the memory and computer program code are further configured to, with the processor, cause the apparatus to:
   connect a function repository in response to receiving the workflow description,
   receive from the function repository function specification data for one or more media processing tasks based on the workflow description,
   define one or more network based media processing tasks on the basis of the media processing function specification data from the function repository,
   generate the workflow, which is representable as a directed acyclic graph, on the basis of the one or more network based media processing tasks that have been defined, and
   deploy the one or more network based media processing tasks that have been defined to selected one or more media processing entities.

6. An apparatus comprising at least one processor, and at least one memory including computer program code, the at least one memory and the computer program code being configured to, with the at least one processor, cause the apparatus to:
   generate a workflow description for network-based media processing,
   include in the workflow description an encryption descriptor comprising information indicative of encryption methods and at least one prioritized encryption method; and
   send the workflow description comprising the encryption descriptor to a workflow manager.

7. The apparatus of claim 6, wherein the memory and computer program code are further configured to, with the processor, cause the apparatus to:
   receive function specification data from a function repository; and
   define the workflow description based on the received function specification data.

8. The apparatus of claim 6, wherein the encryption descriptor associates a source entity with at least one supported encryption method.

9. The apparatus of claim 6, wherein the encryption descriptor indicates an algorithm for generating an encryption token.

10. The apparatus of claim 6, wherein the encryption descriptor indicates a resource locator of an encryption token in the media source or on an encryption server.

11. The apparatus of claim 6, wherein the encryption descriptor comprises a template for generating a uniform resource locator of an encryption token.

12. The apparatus of claim 6, wherein the encryption descriptor indicates length of an encryption token.

13. The apparatus of claim 6, wherein the encryption descriptor comprises an encryption token.

14. The apparatus of claim 6, wherein the encryption descriptor indicates association of a media stream and an encryption token.

15. The apparatus of claim 6, wherein the encryption descriptor indicates lifetime, replacement period, or rotation period of an encryption token.

16. The apparatus of claim 6, wherein the encryption descriptor indicates direction in which at least one of the encryption methods is to be used.

17. The apparatus of claim 6, wherein the encryption descriptor comprises a priority list mapped to a list of the encryption methods.

18. The apparatus of claim 6, wherein the encryption descriptor is included as an attribute in a security descriptor of the workflow description.

19. The apparatus of claim 6, wherein the encryption descriptor is included as in requirements descriptor of the workflow description.

20. A method, comprising:
generating a workflow description for network-based media processing by a source entity,
including in the workflow description an encryption descriptor comprising information indicative of encryption methods and at least one prioritized encryption method; and
sending the workflow description comprising the encryption descriptor to a workflow manager.

* * * * *